Dec. 16, 1941.   R. G. PIETY   2,266,071
WELL SURVEYING DEVICE
Filed May 31, 1939   3 Sheets-Sheet 3
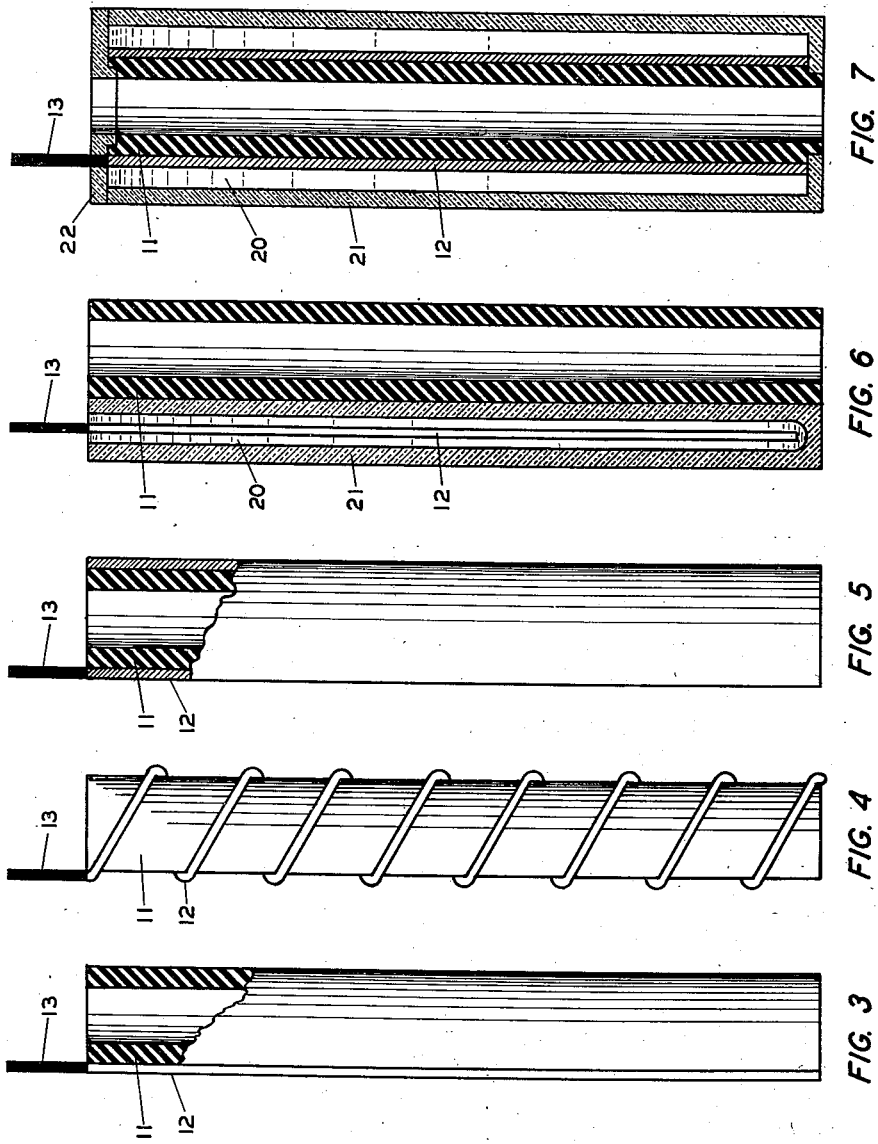
INVENTOR
R.G. PIETY
ATTORNEYS Patented Dec. 16, 1941

2,266,071

UNITED STATES PATENT OFFICE 2,266,071

WELL SURVEYING DEVICE

Raymond G. Piety, Bartlesville, Okla., assignor to Phillips Petroleum Company, a corporation of Delaware Application May 31, 1939, Serial No. 276,741

5 Claims. (Cl. 175—182)

This invention relates to improvements in apparatus and method for determining the nature of geological structure by electrical means.

In drilling for oil it is desirable to obtain information which will identify the geological strata being penetrated by the drill hole. It is customary when using a rotary drill to take samples of cuttings during the drilling operation. Such samples are easily obtained, but often do not provide enough information concerning the nature of the structure. Another method has been to take "cores" or cylindrical samples, cut from the rock during the drilling operations. This method gives good results but is time consuming and expensive.

Certain physical properties of subsurface strata are detectable by electrical means and form a basis for exploration of drill holes. The most important property involved is the electrical resistivity of the subsurface layers which show wide variations due to differences in quantity and quality of the fluid content of the formations. Variations in dielectric constant are less pronounced, but are great enough to be useful for exploration purposes. The electrical potential generated at the interface between the drill hole and porous formations which it penetrates, due either to differences in electrolytic concentration between the drilling fluid and the formation fluids or to passage of fluid into or out of the rock pores (electrofiltration), also furnishes useful information.

Methods of determining conductivity and admittance which have been proposed make use of localized electrodes and measure effects at these electrodes. These methods are limited to a small region near the bore hole for their effects. The present invention uses a large electrode and considerably extends the region influencing the flow of current. The present invention is an improvement on the method and apparatus disclosed in the applicant's co-pending application, Serial No. 276,740, filed simultaneously with this application.

The object of this invention is to obtain data electrically in bore holes.

Other objects and advantages will be apparent from the specification and from the accompanying drawings.

Figure 3 is an enlarged view partly in section and partly in elevation of the electrode shown in Figures 1 and 2.

Figures 4-7 inclusive are views of various modifications of the movable electrode which may be used.

Figure 1:
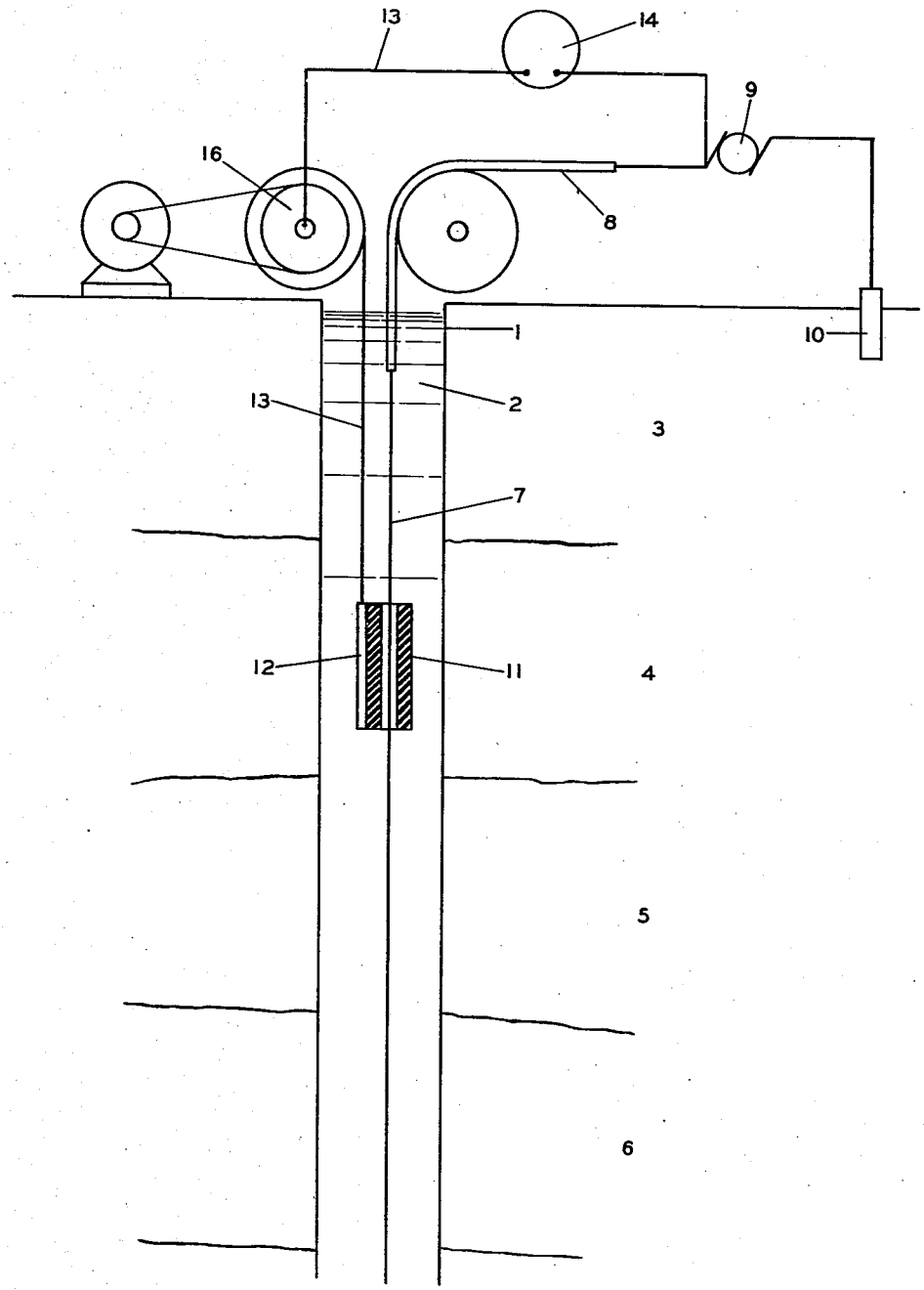
Figure 1 is a vertical sectional view through a bore hole showing one form of this invention in operative position.

Referring to Figure 1, the numeral 1 refers to a bore hole normally filled with water or drilling fluid 2 and piercing various earth strata 3, 4, 5, and 6. A long electrode 7 which may consist of a bare wire is suspended in the bore hole by means of an insulated conductor 8. Conductor 8 is connected to one output terminal of a source of electrical current 9, which has its opposite output terminal connected to a grounded electrode 10. Grounded electrode 10 may be placed on the surface of the earth or in the bore hole.

A movable electrode 12 consisting of a conducting surface, which may be of the non-polarizing type, is suspended in the bore hole parallel to or concentric with electrode 7 and insulated therefrom by an insulating tube 11. Insulating tube 11 has a sufficiently small inside diameter to make the current paths around the ends and into that portion of electrode 7 within the tube poorly conducting or to introduce a known correction. Electrode 12 is suspended by an insulated conductor 13 which is connected to the electrical current source 9. A power reel 16 is provided to move electrode 12 along electrode 7. A recording meter 14 is connected between current source 9 and electrode 12 to measure the current flowing through conductor 13.

In operation a potential is applied between electrodes 7 and 12 in the bore hole and grounded electrode 10 by the current source 9, causing current to flow through the intervening earth strata. Either direct or alternating current may be supplied to the electrodes. With movable electrode 12 in an inoperative position at the surface of the earth, current will enter electrode 7 along its entire length, more entering where the current density is greatest in the formation, i. e., in strata having high conductivity. Movable electrode 12 is lowered into operating position in bore hole 1 to the region to be explored, where it is moved along electrode 7 by means of power reel 16. The current which would normally enter electrode 7 along that portion intermediate the ends of insulating tube 11 is intercepted by movable electrode 12 and flows through conductor 13 and recording meter 14 to the current source 9. By recording the current intercepted by movable electrode 12, the extent and relative conductivity or resistivity of each stratum may be determined.

Figure 2:
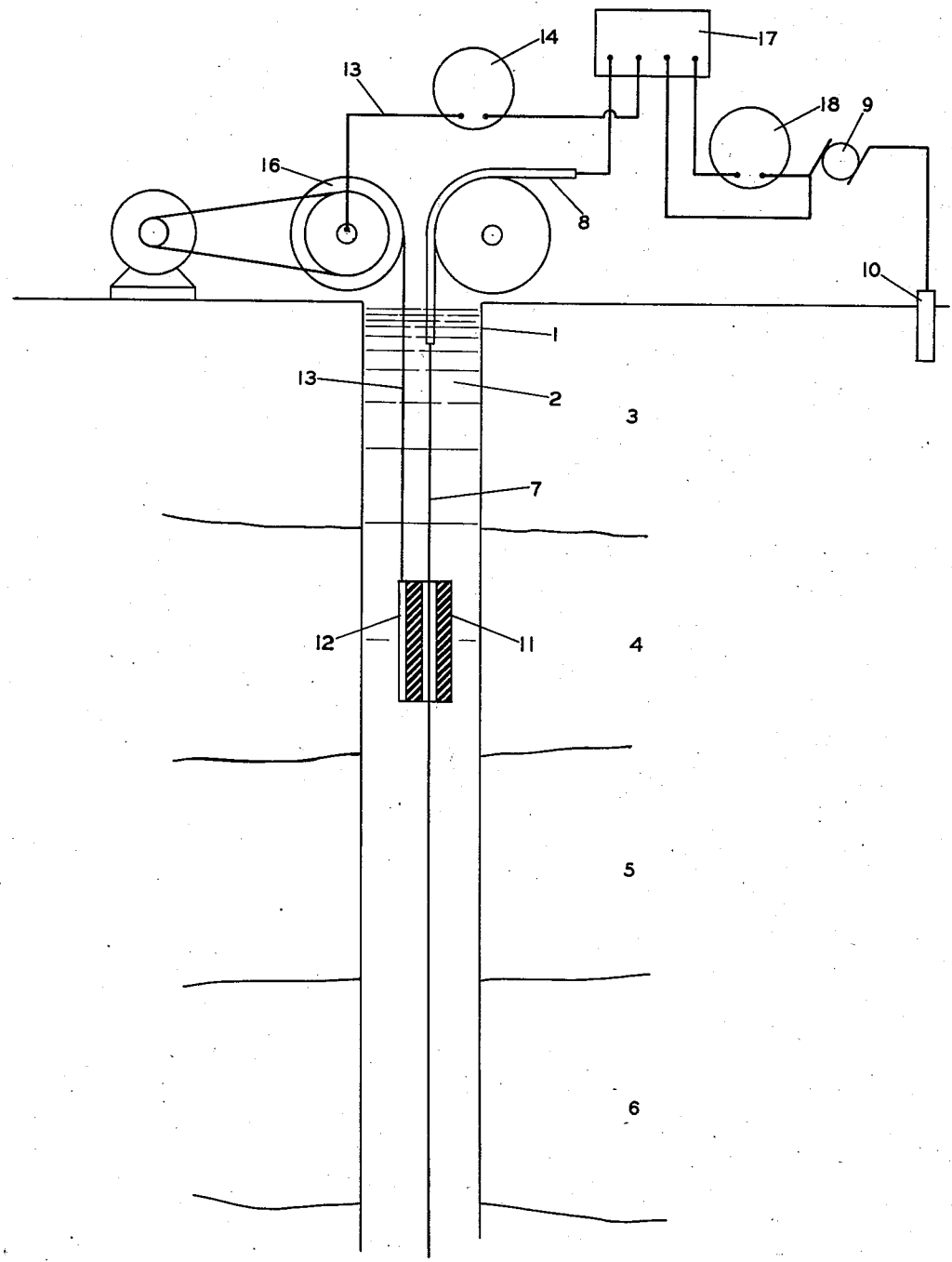
Figure 2 is a vertical sectional view through a bore hole illustrating a modification of this invention.

In Figure 2, the device is modified to measure the change in phase between the current in the main circuit and current entering movable electrode 12 when alternating current is supplied by the current source 9. A meter 17 of the dynamometer type or an alternating current potentiometer is connected with conductors 8 and 13 and one pole of the alternating current generator. The dynamometer type meter has the field coil and moving coil terminals brought out separately. The deflection of the meter will then be proportional to the product of the currents in each coil multiplied by the cosine of phase angle between the two currents, so that if the currents are known the phase angle may be determined. A recording meter 18 is connected between alternating current source 9 and conductor 8 to measure the total current flowing from electrode 7 to or from the current source.

Figures 3-7 inclusive illustrate various forms of the movable electrode which may be used. In Figure 3 a conductor 12 is mounted on the surface of an insulating tube 11. Figure 4 shows conductor 12 wound in a spiral manner around the insulating tube, whereas in Figure 5, conductor 12 consists of a long cylinder concentric with and mounted on insulating tube 11. Figures 6 and 7 illustrate two forms of non-polarizing electrodes which may be used. In Figure 6, conductor 12 is immersed in a solution of its salt 20 which is contained in a porous vessel 21 attached to the outside surface of insulating tube 11. In Figure 7, the electrode illustrated in Figure 5 is surrounded by a porous cylinder 21 containing a saturated salt solution 20. A cover 22 is provided to prevent mixing with fluid of the bore hole when the electrode is in operative position.

This system will obtain data which is useful also for approximating the extent to which the strata extend beyond the bore hole, and for locating non-conformities or deposits near the bore hole. For example, if one of the strata, say 4, is a poor conductor, it will tend to reduce the amount of current reaching the formation below it, but if 4 extends laterally only a short distance from the bore hole, then by moving electrode 10 away from the bore hole the currents can flow around 4 and enter the lower layers more readily. Electrode 10 may be moved radially or circumferentially relative to the bore hole to determine extent or direction of various strata.

The use of different frequencies offers some control over the current distribution; at high frequencies, the current will tend to flow near the surface. In order to force high frequency current down, the insulated conductor 8 may be lengthened to extend some distance into the bore hole. Moving electrode 10 to various positions may result in reduction of the skin effect at high frequencies and tend to make the current paths spread out.

Various changes may be made without departing from the spirit of the invention as set forth in the claims.

I claim:

1. A method of electrically logging a bore hole comprising suspending an elongated electrode in the bore hole to be logged, grounding a second electrode, setting up an electrical potential between the two electrodes to establish a current, intercepting current at points along the length of the elongated electrode and comparing the characteristics of the intercepted current with those of the first claimed current.

2. A method of electrically logging a bore hole comprising suspending an elongated electrode in the bore hole to be logged, grounding a second electrode, establishing an electrical potential between the two electrodes, interposing a third electrode to intercept current at a point on the elongated electrode, and measuring the current in the third electrode.

3. Apparatus for electrically logging a bore hole comprising a source of electrical potential, an elongated electrode connected to one side of the source and extending into the bore hole, a grounded electrode connected to the other side of the source, a third electrode arranged to move along the length of the elongated electrode, the third electrode having co-extensive means associated therewith to insulate a portion of the elongated electrode, means for measuring the current in the elongated electrode and means for measuring the current in the third electrode.

4. A method of electrically logging a bore hole comprising suspending an elongated electrode in the bore hole to be logged, grounding a second electrode, establishing an electrical potential between the two electrodes and intercepting the current for a constant proportion of the length of the elongated electrode by a third electrode and comparing the relative phase and magnitude of the current in the third electrode with those of the current in the elongated electrode.

5. Apparatus for electrically logging a bore hole having fluid therein comprising a source of electrical potential, an elongated electrode connected to one side of the source and extending into the bore hole, a grounded electrode connected to the other side of the source, a third electrode arranged to move along the length of the elongated electrode, the third electrode having means associated therewith substantially to isolate a section of the elongated electrode from the fluid, means for measuring the current in the elongated electrode and means for measuring the current in the third electrode.

RAYMOND G. PIETY.